(12) United States Patent
Danilov et al.

(10) Patent No.: US 11,507,279 B2
(45) Date of Patent: Nov. 22, 2022

(54) DATA STORAGE MIGRATION IN REPLICATED ENVIRONMENT

(71) Applicant: EMC IP Holding Company LLC, Hopkinton, MA (US)

(72) Inventors: Mikhail Danilov, Saint Petersburg (RU); Yohannes Altaye, Dumfries, VA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 333 days.

(21) Appl. No.: 16/781,296

(22) Filed: Feb. 4, 2020

(65) Prior Publication Data

US 2021/0240359 A1 Aug. 5, 2021

(51) Int. Cl.
G06F 12/00 (2006.01)
G06F 3/06 (2006.01)
G06F 11/10 (2006.01)
G06F 11/20 (2006.01)

(52) U.S. Cl.
CPC ............ *G06F 3/0619* (2013.01); *G06F 3/067* (2013.01); *G06F 3/0647* (2013.01); *G06F 3/0664* (2013.01); *G06F 11/1004* (2013.01); *G06F 11/1076* (2013.01); *G06F 11/2023* (2013.01)

(58) Field of Classification Search
CPC .... G06F 3/0646; G06F 3/0647; G06F 3/0649; G06F 3/065; G06F 3/0652; G06F 2206/1004; G06F 2206/1012
See application file for complete search history.

(56) References Cited

U.S. PATENT DOCUMENTS

| 10,318,191 | B1 | 6/2019 | Danilov et al. |
| 2017/0272209 | A1* | 9/2017 | Yanovsky ............. H04L 9/0863 |
| 2019/0294582 | A1* | 9/2019 | Zhu ......................... G06F 3/067 |
| 2020/0285611 | A1* | 9/2020 | George ................. G06F 16/289 |

OTHER PUBLICATIONS

Danilov, et al., "Data Transformation for Objective Storage," Patent Application filed Dec. 13, 2016, 23 pages.
Danilov, et al., "Efficient Migration to Distributed Storage," Patent Application filed Dec. 13, 2016, 22 pages.

* cited by examiner

*Primary Examiner* — Arvind Talukdar
(74) *Attorney, Agent, or Firm* — Amin, Turocy & Watson, LLP

(57) ABSTRACT

The described technology is generally directed towards replicating metadata representing a virtual data structure corresponding to replicated legacy data instead of the actual data for the data structure. Once virtual chunks are replicated to a remote, newer storage system, the corresponding legacy data is locally read into the virtual chunks to transform the virtual chunks into real data chunks of the remote newer storage system. A checksum can be replicated for the remote newer storage system to evaluate the consistency of the data. Efficient data storage migration is thus accomplished in a replicated environment based on relatively negligible replication traffic between two remote locations, while still assuring the consistency of migrated data.

20 Claims, 11 Drawing Sheets

DATA STORAGE MIGRATION IN REPLICATED ENVIRONMENT

TECHNICAL FIELD

The subject application relates generally to data storage, and, for example, to a technology that facilitates efficiently migrating data in a replicated storage system environment with virtually no actual data copying between the storage systems' locations, and related embodiments.

BACKGROUND

Contemporary data storage systems, such as Dell EMC®'s ECS (formerly Elastic Cloud Storage) service, store data in a way that ensures data protection while retaining storage efficiency. For additional protection of user data and metadata, ECS supports geographically distributed setups of multiple zones (geographically distributed node clusters), with the data and metadata of one zone distributed and replicated to two or more zones by asynchronous replication.

Over time data storage systems evolve, and clients using a legacy data storage system want to update to a newer data storage system. For example, ECS supports CENTERA storage API (a legacy object storage system previously offered by Dell EMC®) and provides some new value-added services. A transformation and migration service performs transformation to assure efficient coexistence of ECS and CENTERA during data migration, in which actual data migration allows CENTERA to be released and removed.

Consider an example in which one data storage system such as ECS 1 is coupled to a legacy storage system such as CENTERA 1, and another data storage system such as ECS 2 is coupled to another legacy storage system such as CENTERA 2. Even with parallel transformation and migration, the legacy data needs to be copied over the network between two potentially remote locations. If the data is approximately evenly distributed in this example scenario, about a half of the legacy data is replicated from ECS 1 to ECS 2, and about a half of the legacy data is replicated from ECS 2 to ECS 1. Because the throughput of a network between remote locations is generally significantly lower than the throughput of a local network, migration is a long process and/or impacts replication of any new data that is created during the duration of such data migration.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
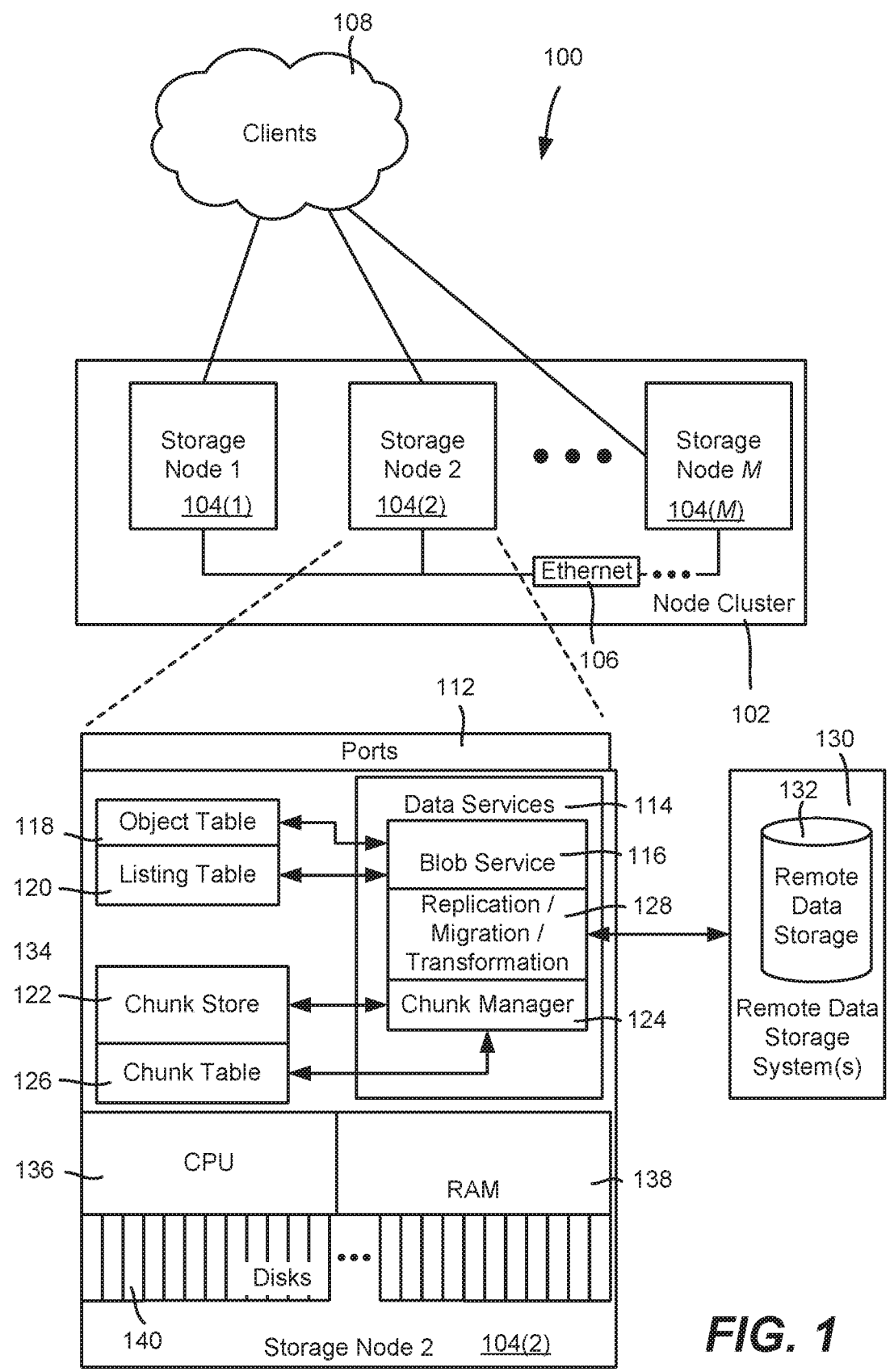
FIG. 1 is an example block diagram representation of part of a data storage system including nodes, in which data is replicated to a remote data storage system, in accordance with various aspects and implementations of the subject disclosure

Various aspects of the technology described herein are generally directed towards more efficient data storage migration in a replicated environment based on relatively negligible replication traffic between two locations, while still assuring the consistency of migrated data. As will be understood, this is accomplished by replication of metadata including replicated virtual data structures (e.g., virtual chunks) that store object data. Once a virtual chunk is replicated (created on) the remote newer storage system, corresponding legacy data is locally read (migrated) into the virtual chunk to convert the virtual chunk into a real data chunk in the remote newer storage system. A checksum is replicated as well, whereby the remote newer storage system can evaluate the consistency of the migrated data.

It should be understood that any of the examples herein are non-limiting. For instance, some of the examples are based on ECS data storage technology in which data is maintained in nodes of a node cluster storage system; however virtually any storage system may benefit from the technology described herein. As a more particular example, the term "chunk" can be used as an example of a unit of data storage, however any data block can be used in other storage systems. Similarly, an "object" (which can be a segment of an object) refers to what is typically part of a data chunk/block, although it is understood that other terms such as file can be used in other data storage systems. Still further, the technology described herein is not limited to geographic zones, but can be used with any parallel data storage systems, including those in geographic zones that are remote to one another, as well as parallel data storage systems coupled via network connections with lower throughput than local network connections. Thus, any of the embodiments, aspects, concepts, structures, functionalities or examples described herein are non-limiting, and the technology may be used in various ways that provide benefits and advantages in computing and data storage in general.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

In ECS, disk space is partitioned into a set of blocks of fixed size called chunks, which in one or more implementations are 128 megabytes in size. The various types of data, including user data and various types of metadata, are stored in chunks. There are different types of chunks, one type per capacity user. In particular, user data is stored in repository chunks, and chunks can be shared. For instance, one chunk for user data may (and in typical cases does) contain segments of multiple user objects.

As set forth herein, united data storage systems (remote to one another, such as located in remote geographic zones) can be used to maintained a replicated copy of each other's data, including user data chunks, for additional data protection. The various user data chunks are distributed among the remote data storage systems, with one remote data storage system (a node in a cluster node storage system) responsible for owning a given data chunk, and the other maintaining a replica of that data chunk.

FIG. 1 shows part of a data storage system 100 (such as ECS) comprising a node cluster 102 of storage nodes 104(1)-104(M), in which each node is typically a server configured primarily to serve objects in response to client requests. The nodes 104(1)-104(M) are coupled to each other via a suitable data communications link comprising interfaces and protocols, such as represented in FIG. 1 by Ethernet block 106.

Clients 108 make data system-related requests to the cluster 102, which in general is configured as one large object namespace; there may be on the order of billions of objects maintained in a cluster, for example. To this end, a node such as the node 104(2) (shown enlarged in FIG. 1 as well) generally comprises ports 112 by which clients connect to the cloud storage system. Example ports are provided for requests via various protocols, including but not limited to SMB (server message block), FTP (file transfer protocol), HTTP/HTTPS (hypertext transfer protocol) and NFS (Network File System); further, SSH (secure shell) allows administration-related requests, for example.

Each node, such as the node 104(2), includes an instance of a data storage system and data services 114; (note however that at least some data service components can be per-cluster, rather than per-node, and possibly per-sub-group of nodes). For example, ECS runs a set of storage services, which together implement storage logic. Services can maintain directory tables for keeping their metadata, which can be implemented as search trees. A blob service 116 maintains an object table 118 (e.g., in various partitions among nodes, including geographically separated zones) that keeps track of objects in the data storage system and generally stores their metadata, including an object's data location information, e.g., within a chunk. The blob service 116 also maintains a listing table 120, although it is alternatively feasible to have such a listing table maintained by another service.

FIG. 1 further represents some additional concepts, in that the user data repository of chunks is maintained in a chunk store 122, managed by another storage service referred to as a chunk manager 124. A chunk table 126 maintains metadata about chunks, e.g., as managed by the chunk manager 124. Note that directory tables and other data can also be maintained in data chunks.

In one or more implementations, the data services 114 can also include replication, migration and transformation-related services (block 128), such as for replication as described herein via communications to and from a remote data storage system 130 and its remote data storage 132. As is understood, data communications between such remote data storage systems can be relatively inefficient, resulting in far lower throughput when compared to local node cluster (e.g., Ethernet 106) data communications. Note that there can be more than two remote data storage systems, however for purposes of explanation two such two remote data storage systems that replicate each other's data and are each coupled to legacy data storage systems, which also replicate each other's legacy data, are described herein.

In FIG. 1, a CPU 136 and RAM 138 are shown for completeness; note that the RAM 138 may comprise at least some non-volatile RAM. The node 104(2) further includes storage devices such as disks 140, comprising hard disk drives and/or solid-state drives, or any other suitable type of storage resource. As can be readily appreciated, components of the data storage system including those described herein can be at various times in any storage device or devices, such as in the RAM 138, in the disks 140, or in a combination of both, for example.

In an ECS and CENTERA implementation, in general, ECS is a primary storage that works as a proxy for legacy CENTERA in that ECS handles the user traffic. The transformation and migration service lists the live data in CENTERA and adds the information to ECS object index. Therefore, some objects identified in the ECS object index are stored in the ECS storage backend, while other objects still reside in CENTERA system that is undergoing transformation. When an application requests ECS to provide an object, and ECS determines that the object belongs to the CENTERA system, ECS reads the object from CENTERA using a CENTERA client library and sends the object back to the application as if it was stored in ECS.

For data migration, the transformation and migration service pulls data from CENTERA and writes the data into virtual chunks laid out in advance for migrated objects, whereby the virtual chunks become real data chunks. The chunk manager 124 performs encoding of the chunk in volatile memory and stores the resulting data and coding fragments to the ECS storage backend, in what is referred to as pull migration.

Enterprises typically have storage systems that operate in a replicated environment, with two or more storage systems united via replication. For example, consider that there are two locations. Each location has a storage system and the two systems are united with bi-directional replication. A data client at each location primarily uses local storage, with the remote storage typically only used for failover.

When data transformation and migration is performed in a replicated environment, the old environment is normally repeated with new storages. For example, each new storage system (e.g., ECS) can be mapped to a corresponding legacy (old) storage system (e.g., CENTERA). For example, ECS 1 can be mapped to CENTERA 1 at a same, first local location; ECS 2 can be mapped to CENTERA 2 at a same, second location, which is remote to the first location. Both new storages, ECS 1 and ECS 2, provide read through functionality using the local CENTERA storage systems to which they are mapped. New writes and reads of new data from are handled by ECS 1 or ECS 2.

The content of the legacy data at each location (e.g., CENTERA 1 and CENTERA 2) is expected to be almost identical. Thus, data transformation and migration is divided between the newer storage systems, e.g., ECS 1 and ECS 2. This can be done with a suitable hash function that is applied to an object ID to find a primary location, e.g., ECS1 or ECS 2, for the object. Each newer storage system manages the objects that are assigned to it via the hash function.

Each newer storage system enumerates the content of the legacy storage system to which it is mapped to obtain a complete list of legacy objects. The list also contains objects assigned to another newer storage system; such objects are not filtered out, but rather the lists of objects are synchronized between the newer storage system in order so as to not to miss legacy objects that exist in one only one legacy data storage system. During a migration phase, a newer storage system reads the content of the objects assigned to it from its mapped-to legacy data storage system. In prior replication technology, the data chunks are replicated such that the results of transformation and migration are shared between the newer storage systems via a standard replication mechanism configured between them.

Figure 2:
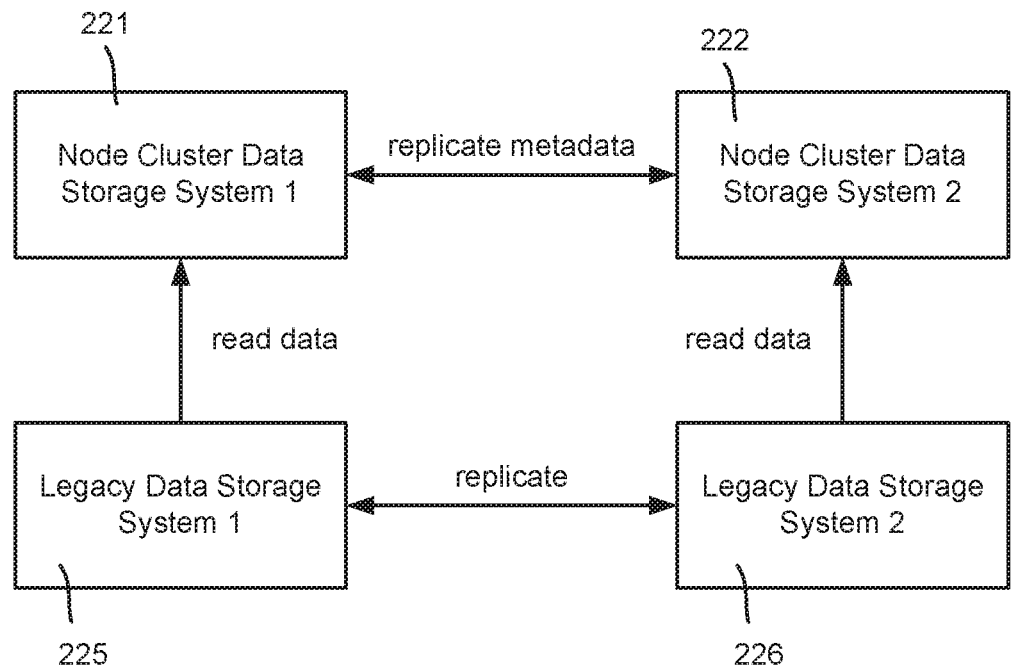
FIG. 2 is an example block diagram representation of node cluster data systems coupled to respective legacy data storage systems, with remote connections for replication of data, in accordance with various aspects and implementations of the subject disclosure

FIG. 2 shows bi-directional replication and storage migration in a replicated environment. Note that FIG. 2 depicts the migration phase only, because communications with data clients and the storage transformation phase are independent of the replication technology described herein.

The newer storage systems, shown in FIG. 2 as node cluster data storage system 1 (221) and node cluster data storage system 2 (222), (e.g. ECS systems), are coupled to read data from legacy data storage system 1 (225) and legacy data storage system 2 (226), (e.g. CENTERA systems) respectively. The node cluster data storage system 1 (221) and node cluster data storage system 2 (222) are coupled to one another for bi-directional replication. The legacy data storage system 1 (225) and legacy data storage system 2 (226) are similarly coupled to one another for bi-directional replication; such replication of legacy data has already occurred, and thus the legacy data of legacy data storage system 1 (225) has a replicated copy of its data on the legacy data storage system 2 (226), and the legacy data of legacy data storage system 2 (226) has a replicated copy of its data on the legacy data storage system 1 (225).

With the technology described herein, the newer storage systems 221 and 223 still create virtual chunks for the legacy data for which they are responsible. Thus, for example, the node cluster data storage system 1 (221) will create a virtual chunk for some data of object or objects stored in the legacy data storage system 1 (225), and read the corresponding data from the legacy data storage system 1 (225) into the virtual chunk, making the virtual chunk real in the node cluster data storage system 1 (221). These virtual chunks define the layout of legacy data within them.

However, with the technology described herein, instead of replicating the real chunk to the replicated new node cluster data storage system 2 (222), only the metadata comprising information about the virtual chunks created on the node cluster data storage system 1 (221) is replicated from the node cluster data storage system 1 (221) to the node cluster data storage system 2 (222), using the existing replication components (e.g., mechanism and primitives). Similarly, only the metadata comprising information about the virtual chunks created on the node cluster data storage system 2 (222) is replicated from the node cluster data storage system 2 (222) to the node cluster data storage system 1 (221). Therefore, there is replication of virtual chunks comprising chunks without actual data. The amount of replicated data is thus significantly less than with actual data chunk replication. Note that virtual chunks are marked as replicated.

The node cluster data storage system that receives a replicated virtual chunk thereafter makes the virtual chunk real by reading data from its locally coupled legacy data storage system. In this way, the real chunks do not need replication, because the chunks have been replicated while they were virtual. To ensure consistency, the node cluster data storage system that provides the virtual data to the other the node cluster data storage system may calculate verification data (e.g., a standard checksum, or possibly a unique or substantially unique hash value) for the data and replicate the verification data to the remote location as part of a chunk's metadata.

Thus, the secondary node cluster data storage system location that receives replicated virtual chunks creates a copy of each such virtual chunk on its data storage system and each chunk real by reading data read from the local legacy data storage system to which it is coupled. The checksums for the copy data chunks can be calculated, and compared with the checksums received from the remote location to assure data consistency. In the event that an inconsistency for a chunk is detected, which is likely to be very rare, the local copy of the real chunk can be replaced using replicated actual data from the remote location.

It should be noted that a node cluster data storage system at any location may find that it cannot read some data object from the local legacy data storage system to which it is locally coupled. In such a situation, which is another rather rare event, the missing/corrupt object can be read from a remote legacy data storage system using the existing/standard replication read failover components (e.g., mechanism and primitives).

The migration phase finishes when the replicated virtual chunks have been made real, which can be done as one complete phase, or in various sub-phases (e.g., when the load from other data storage system operations is low). Note again that this process requires virtually no copying of legacy data between locations.

Figure 3:
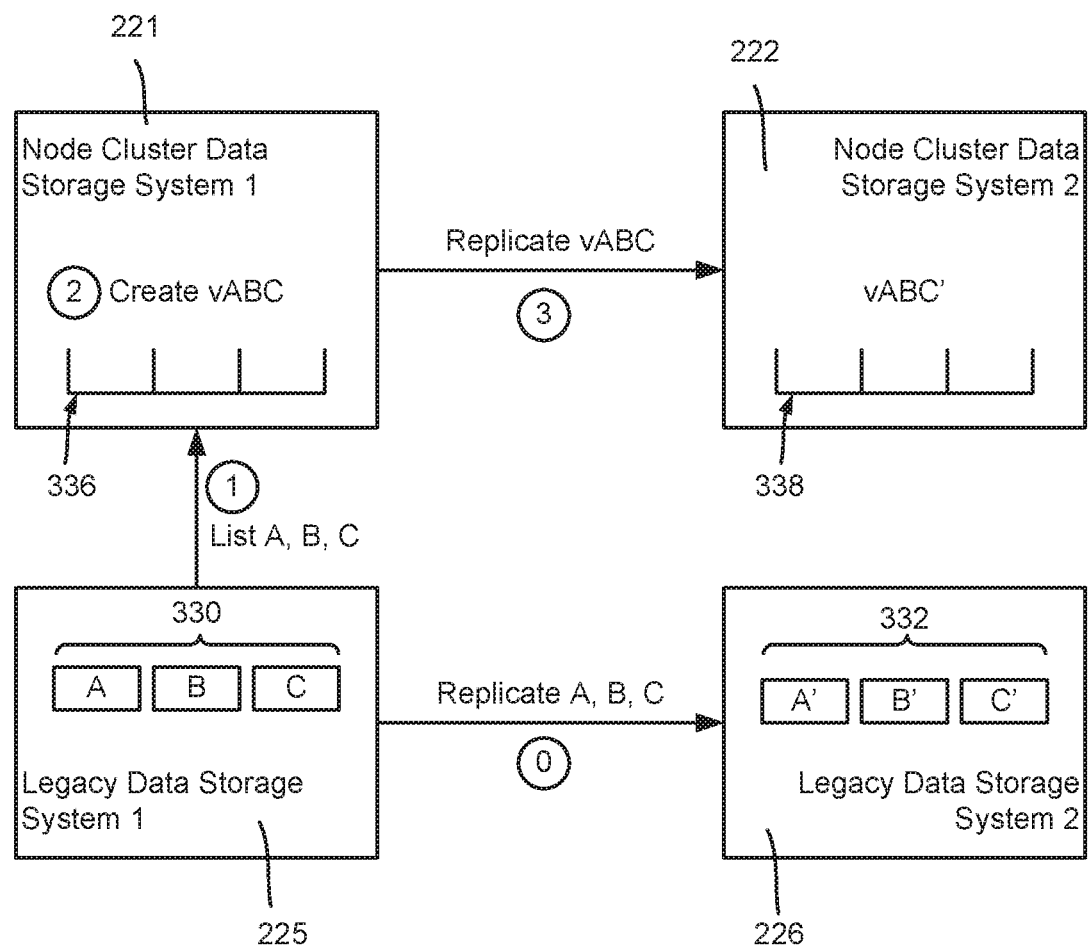
FIGS. 3 and 4 are example block diagram/data flow diagram representations related to replicating metadata (e.g., virtual data chunks and checksums) to a remote location for efficient data replication, in accordance with various aspects and implementations of the subject disclosure.
Figure 4:
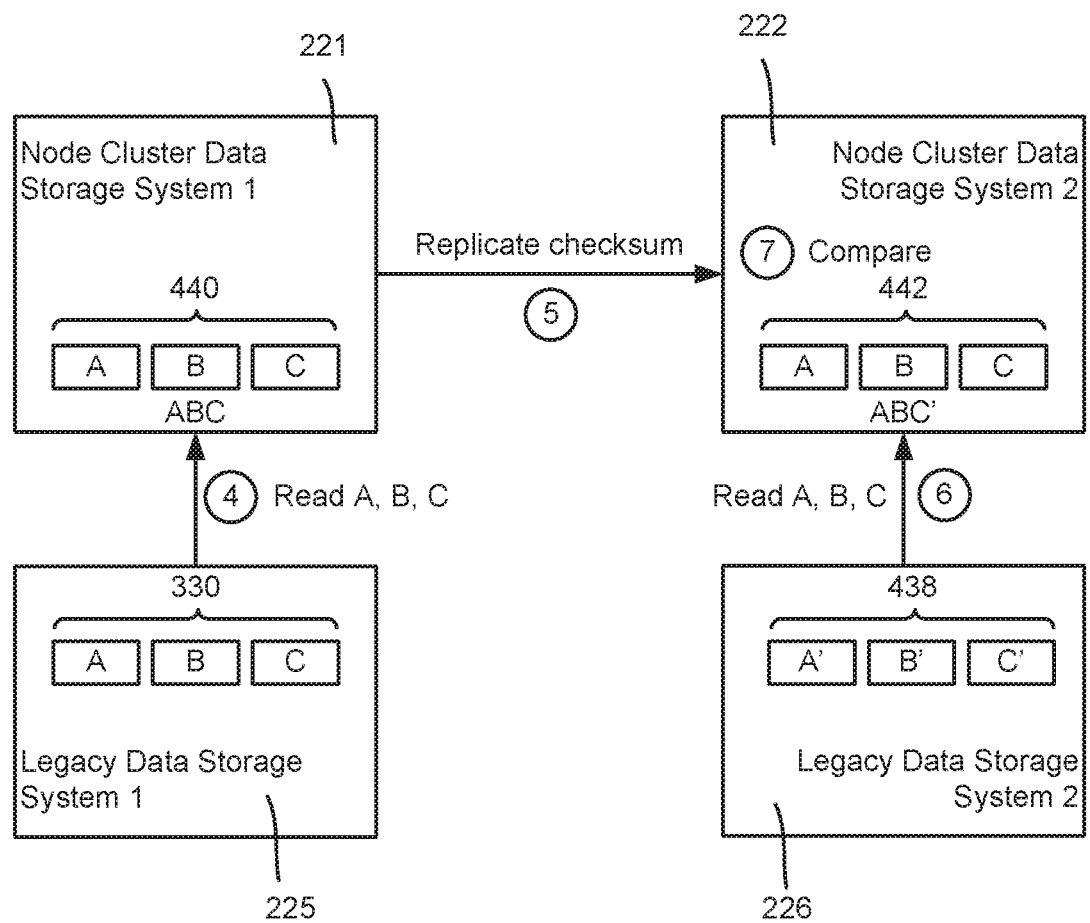

By way of a more specific example, FIG. 3 shows the replication of a virtual chunk, and FIG. 4 shows parallel data migration based on the replicated virtual objects. In FIG. 3, there are legacy objects A, B, and C, together labeled 330. The legacy objects 330 were created within the legacy data storage system 1 (225) and replicated to the legacy data storage system 2 (226) at some point in the past, as represented in FIG. 3 by the arrow accompanied by circled numeral zero (0), and by the copy A', B', and C' 332 in the block 226.

The node cluster data storage system 1 (221) lists the objects (the arrow accompanied by circled numeral one (1)), and creates virtual chunk vABC 336 to accommodate the data (the "Create vABC" text accompanied by circled numeral two (2)). Note that the transformation, migration and replication service 128 (FIG. 1) creates new virtual chunks in accordance with a created layout, that is, creates virtual chunks with no physical capacity allocated for them.

The virtual chunk is replicated to the second location, that is, the node cluster data storage system 2 (222), as represented in FIG. 3 by the arrow accompanied by circled numeral three (3). The node cluster data storage system 2 (222) creates a backup copy (vABC') 338 of the replicated virtual chunk, e.g., in its local memory, and thus at this point contains a backup copy of the virtual chunk.

As represented in FIG. 4, the node cluster data storage system 1 (221) reads the objects A, B and C 330 from its locally coupled legacy data storage system 1 (225) to make the virtual chunk vABC (336, FIG. 3) a real chunk ABC 440 as represented in FIG. 4 by the arrow accompanied by circled numeral four (4). Note that when a data read requests concerns a virtual chunk created for legacy data, the read request is redirected to the legacy data storage system 1 (225). Once the data is ready, a checksum for the data is computed, and replicated to ECS 2 (the arrow accompanied by circled numeral five (5)).

The node cluster data storage system 2 (222) produces a backup copy (ABC') 442 of the real chunk 440 (ABC) by reading data from its locally coupled legacy data storage system 2 (226), as represented in FIG. 4 by the arrow accompanied by circled numeral six (6). The node cluster data storage system 2 (222) generates a checksum for the backup copy (ABC') 442, and compares the generated checksum with the replicated checksum to ensure that the two copies of the real chunk are identical (as represented in FIG. 4 by the "Compare" text accompanied by circled numeral seven (7)). Ordinarily the checksums will match, such that thereafter data can be read from the real backup copy ABC' 442 whenever needed.

It should be noted that the examples of FIGS. 3 and 4 show replication of metadata between the newer node cluster data storage systems (and replication of the corresponding legacy object data) in one direction. However, it is understood that replication of metadata and legacy object data is bidirectional, and similar replication can be in the opposite direction, including in parallel or substantially in parallel. Indeed, the node cluster data storage system 2 (222) can be creating a different virtual object such as vDEF for subsequently storing its local legacy objects in a real chunk for DEF, and replicating a virtual object copy DEF' and corresponding checksum to the node cluster data storage system 1 (221) to create a real chunk that stores DEF on the node cluster data storage system 1 (221).

Figure 5:
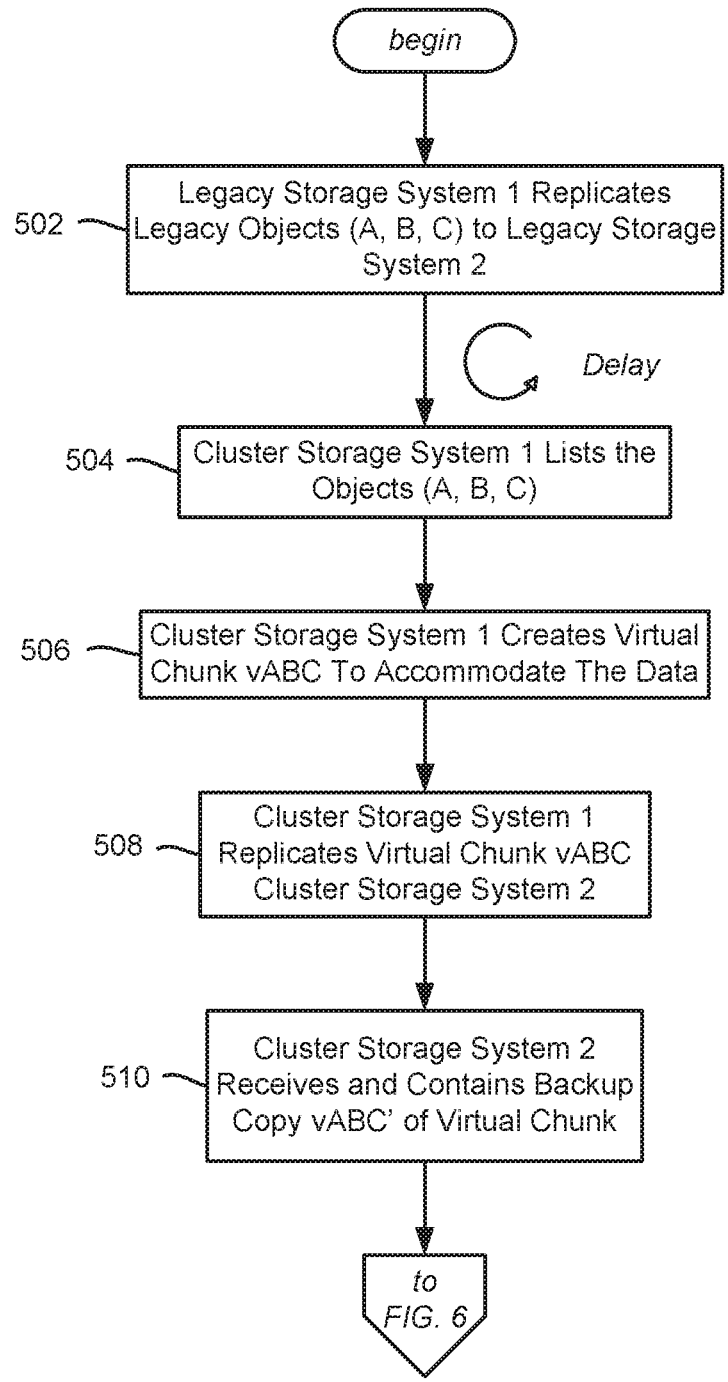
FIG. 5 and FIG. 6 comprises an example flow diagram showing example operations related to efficient data replication by the use of replicated metadata, in accordance with various aspects and implementations of the subject disclosure.
Figure 6:
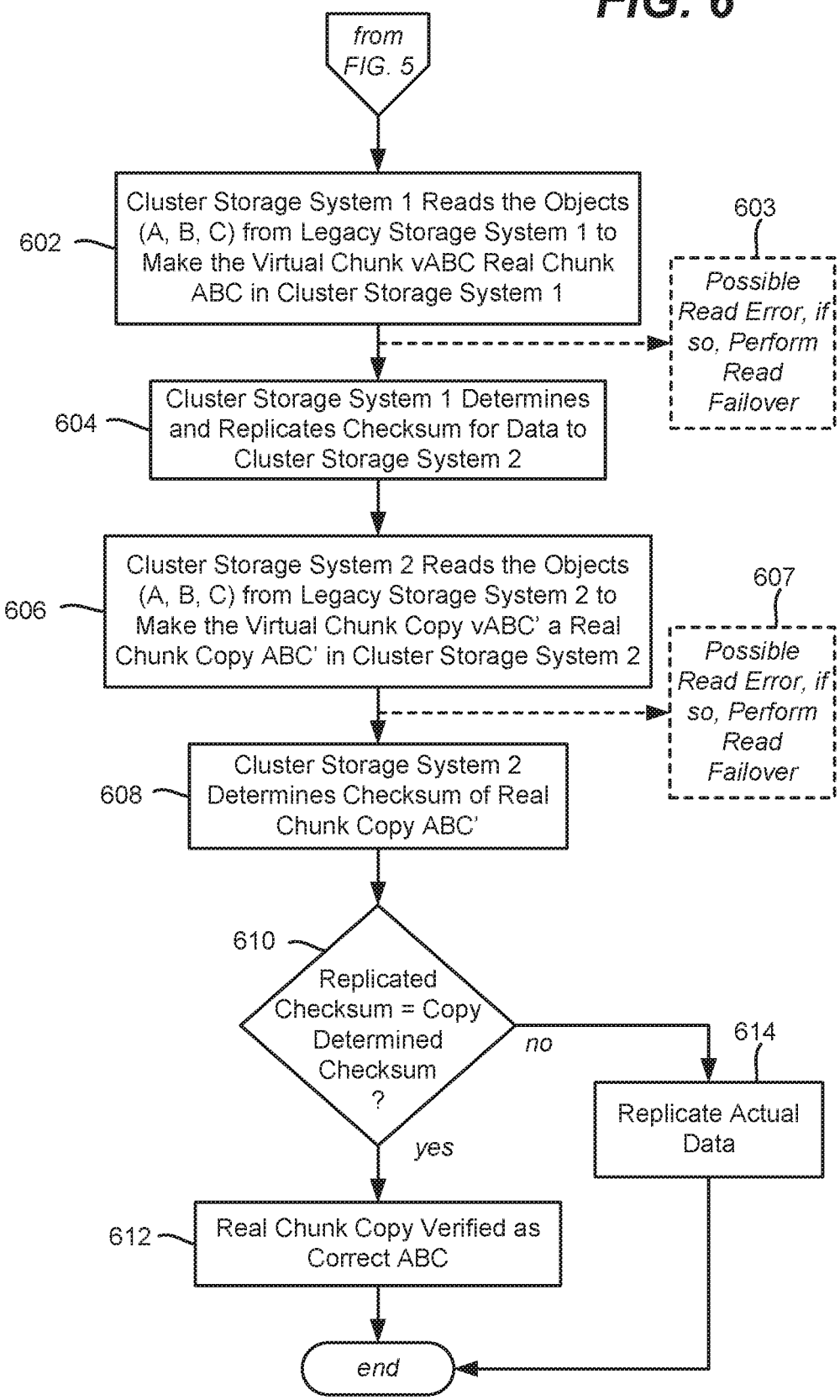

FIGS. 5 and 6 comprise a flow diagram of example operations related to the replication and migration operations of FIGS. 3 and 4, beginning at operation 502 where the legacy data storage system 1 (225) replicates legacy objects A, B and C to the legacy data storage system 2 (225). This may occur at some time in the past, as shown in FIG. 5 by the "delay" indication.

At some later time, storage migration and replication is desired for these objects, and thus operation 504 represents the cluster storage system 1 that is responsible for these legacy objects listing them The service uses the list of objects in the legacy data storage system to create their future layout in chunks.

Thus, operation 506 represents creating a virtual chunk vABC to accommodate the actual data. As described herein, operation 508 replicates a copy of the virtual chunk vABC' to the cluster storage system 2. At operation 510, the cluster storage system 2 receives, creates in memory and thus contains the backup copy vABC' of the virtual chunk vABC.

At operation 602, the cluster storage system 1 reads the objects (A, B, C) from the legacy storage system 1 to make the virtual chunk vABC a real chunk ABC in the cluster storage system 1. At operation 604, the cluster storage system 1 computes a checksum for the data, and replicates the checksum to the cluster storage system 2.

At some time after the virtual chunk copy ABC' is received, at operation 606 the cluster storage system 2 reads the ABC data from its local legacy storage system 2 to make the virtual chunk copy a real chunk containing the data. Based on this real copy, the cluster storage system 2 computes a checksum.

Operation 610 compares the replicated checksum with the checksum determined via operation 608, and if they are equal, verifies that the real chunk copy is a correct copy of the chunk for ABC object data. Otherwise, operation 614 performs replication of the actual data.

It should be noted that the read attempts at operations 602 or 606 can result in determining that an object is missing or has corrupt data. In such an event, operations 603 or 607, respectively, represent using the existing/standard replication read failover operations to obtain the correct data.

Figure 7:
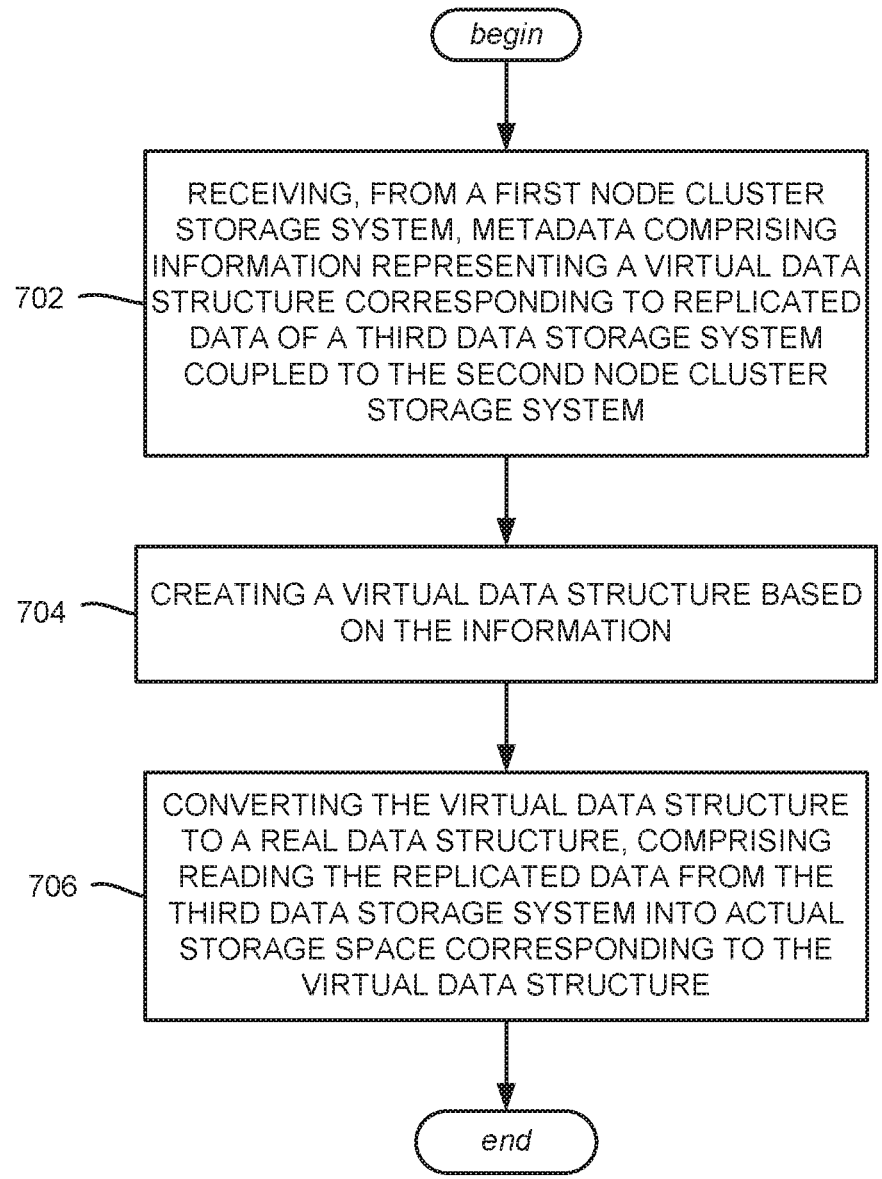
FIG. 7 is a flow diagram showing example operations related to receiving a replicated virtual data structure and converting the virtual data structure into a copy of a real data structure by reading from another data storage system, in accordance with various aspects and implementations of the subject disclosure.

One or more aspects can be embodied in a system, such as represented in FIG. 7, and for example can comprise a memory that stores computer executable components and/or operations, and a processor (e.g., a processor in a second node cluster storage system) that executes computer executable components and/or operations stored in the memory. Example operations can comprise operation 702, which represents receiving, from a first node cluster storage system, metadata comprising information representing a virtual data structure corresponding to replicated data of a third data storage system coupled to the second node cluster storage system. Operation 704 represents creating a virtual data structure based on the information. Operation 706 represents converting the virtual data structure to a real data structure, comprising reading the replicated data from the third data storage system into actual storage space corresponding to the virtual data structure.

The real data structure can be a second real data structure intended to be a replica of a first real data structure maintained at the first node cluster storage system, and further operations can comprise verifying whether the second real data structure is consistent with the first real data structure.

Receiving the metadata can further comprise receiving a first checksum corresponding to the first real data structure, and verifying whether the second real data structure is consistent with the first real data structure can comprise determining a second checksum based on the second real data structure, and comparing the first checksum with the second checksum. The comparing can provide an indication that that the first checksum does not equal the second checksum, and in response to the indication, further operations can comprise requesting actual data of the first real data structure from the first node cluster storage system, receiving the actual data, and writing the actual data to the second real data structure.

The real data structure can comprise a data chunk. The real data structure can be protected via erasure encoding.

The metadata can comprise first metadata, the information can comprise first information, the virtual data structure can be a first virtual data structure, the replicated data can be first replicated data, the real data structure can be a first real data structure, and further operations can comprise, sending second metadata comprising second information representing a second virtual data structure from the second data storage system to the first data storage system, wherein the second virtual data structure corresponds to second replicated data to be read into a second real data structure by the first data storage system.

The first data storage system can be coupled to a fourth data storage system that contains the second replicated data. The third data storage system can comprise a legacy data storage system.

Figure 8:
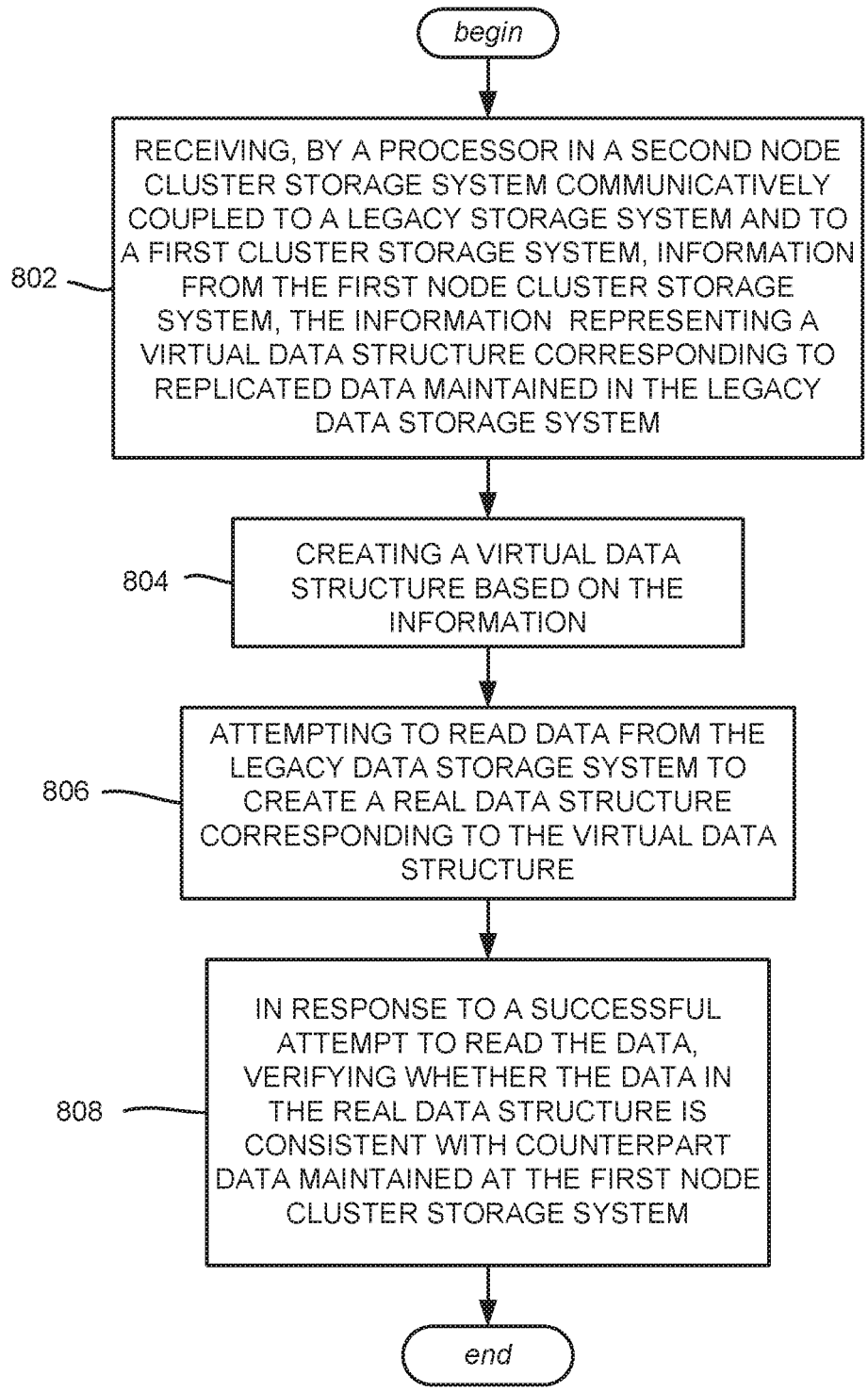
FIG. 8 is a flow diagram showing example operations related to receiving a replicated virtual data structure, converting the virtual data structure into a copy of a real data structure by reading from another data storage system, and verifying the data in the real data structure, in accordance with various aspects and implementations of the subject disclosure.

One or more example aspects, such as corresponding to example operations of a method, are represented in FIG. 8. Operation 802 represents receiving, by a processor in a second node cluster storage system communicatively coupled to a legacy storage system and to a first cluster storage system, information from the first node cluster storage system, the information representing a virtual data structure corresponding to data maintained in the legacy data storage system. Operation 804 represents creating a virtual data structure based on the information. Operation 806 represents attempting to read data from the legacy data storage system to create a real data structure corresponding to the virtual data structure. Operation 808 represents, in response to a successful attempt to read the data, verifying whether the data in the real data structure is consistent with counterpart data maintained at the first node cluster storage system.

Attempting to read the data from the legacy data storage system can be successful, and verifying can determine that the data in the real data structure is consistent with the counterpart data; aspects can comprise responding to requests for data maintained in the real data structure by accessing the data maintained in the real data structure.

Aspects can comprise receiving first verification data associated with the virtual data structure from the first cluster storage system; verifying whether the data in the real data structure is consistent with counterpart data maintained at the first cluster can comprise evaluating the first verification data with second verification data based on the data in the real data structure.

Attempting to read the data from the legacy data storage system can be unsuccessful, and aspects can comprise performing a read failover operation to obtain the data.

Attempting to read the data from the legacy data storage system can be successful, and verifying whether the data in the real data structure is consistent with counterpart data maintained at the first node cluster storage system can determine that the data is inconsistent; aspects can comprise requesting actual data for the real data structure from the first cluster storage system, receiving the actual data, and storing the actual data in the real data structure in place of the inconsistent data.

The information can comprise first information, the virtual data structure can be a first virtual data structure, the data maintained in the legacy data storage system can be first legacy data, the real data structure can be a first real data structure, and aspects can comprise sending second information representing a second virtual data structure from the second data storage system to the first data storage system, wherein the second virtual data structure corresponds to second legacy data to be read into a second real data structure by the first data storage system.

Figure 9:
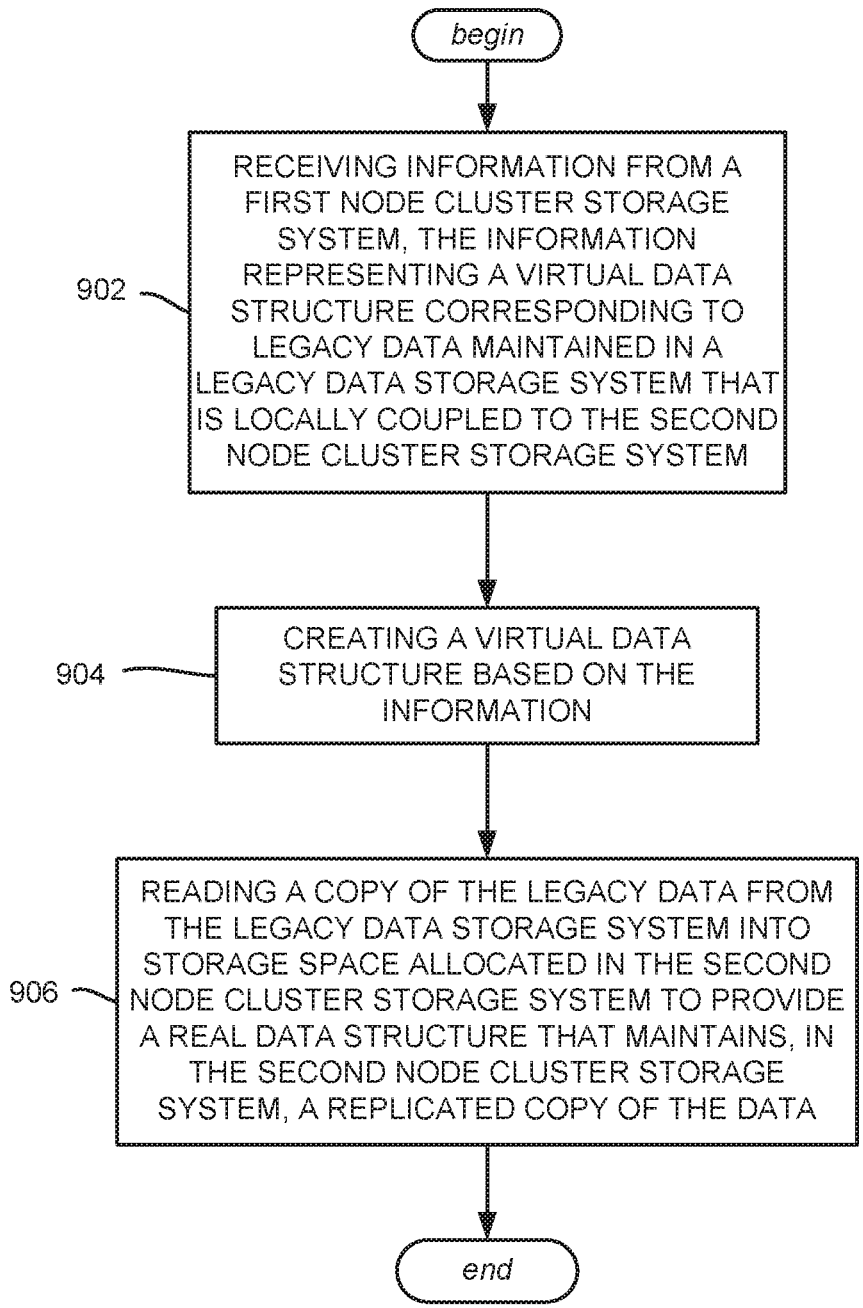
FIG. 9 is a flow diagram showing example operations related to receiving a replicated virtual data structure and converting the virtual data structure into a copy of a real data structure by reading from a locally-coupled legacy data storage system, in accordance with various aspects and implementations of the subject disclosure.

FIG. 9 summarizes various example operations, e.g., corresponding to a machine-readable storage medium, comprising executable instructions that, when executed by a processor of a second node cluster storage system in a replicated storage environment, facilitate performance of operations. Operation 902 represents receiving information from a first node cluster storage system, the information representing a virtual data structure corresponding to legacy data maintained in a legacy data storage system that is coupled to the second node cluster storage system. Operation 904 represents creating a virtual data structure based on the information. Operation 906 represents reading the legacy data from the legacy data storage system into storage space allocated in the second node cluster storage system to provide a real data structure that maintains the data in the second node cluster storage system.

Further operations can comprise receiving a request for object data, determining that the object data is maintained in the real data structure in the second node cluster storage system, reading the object data from the real data structure, and returning the object data in response to the request.

Further operations can comprise receiving a checksum in conjunction with the information from the first node cluster storage system, and using the checksum to verify the data in the real data structure.

The information can be first information, the virtual data structure can be a first virtual data structure, and further operations can comprise creating a second virtual data structure corresponding to second legacy data maintained in the legacy data storage system, and sending second information representing the second virtual data structure to the first node cluster storage system to facilitate a data migration operation.

The legacy data can be first legacy data, wherein the real data structure can be a first real data structure, wherein the storage space can be first storage space, and further operations can comprise reading second legacy data from the legacy data storage system into the into second storage space corresponding to the second virtual data structure to provide a second real data structure.

As can be seen, described herein is technology for data replication using metadata (virtual chunks) instead of actual data. The technology thus significantly reduces the amount of data transferred over to a remote location, which significantly improves replication efficiency. The technology can use existing replication and migration primitives to minimize data copying between storage systems' locations.

Figure 10:
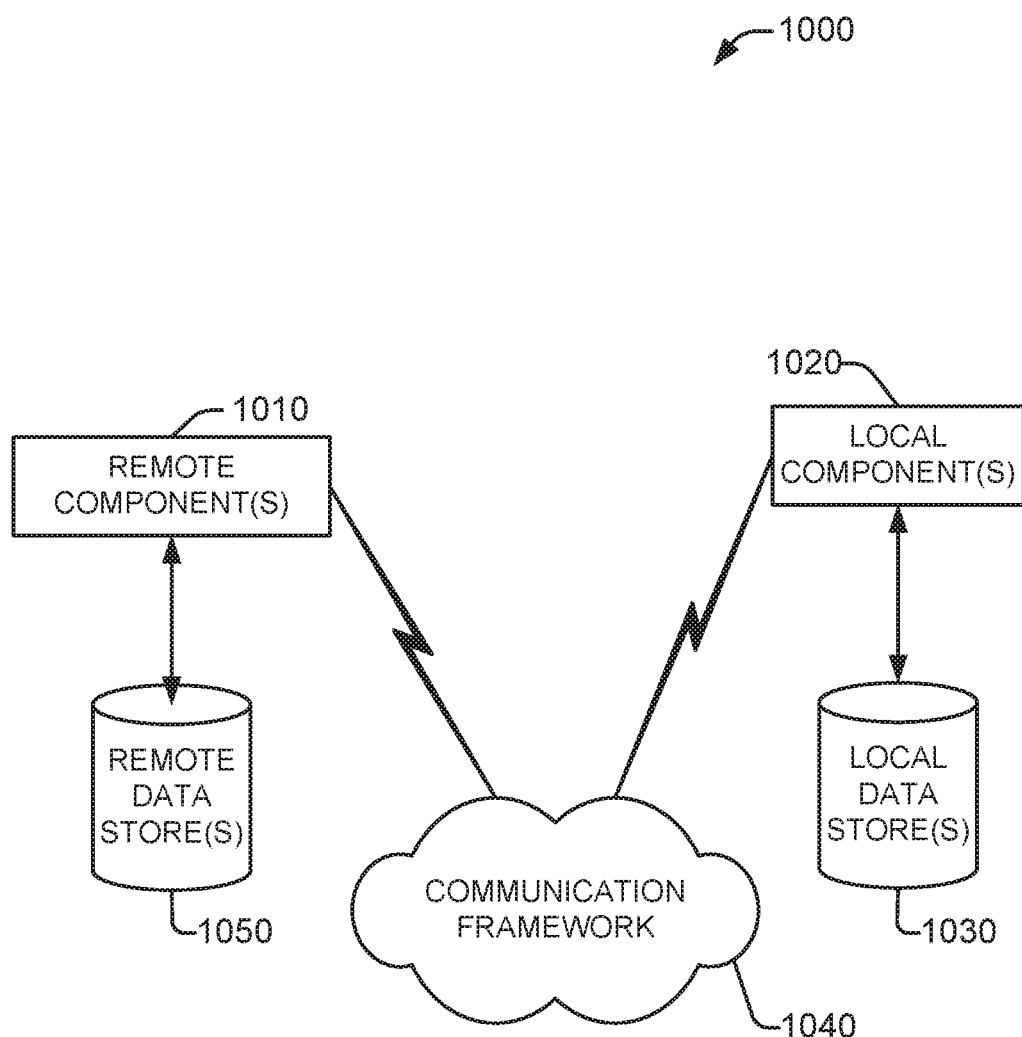
FIG. 10 is a block diagram representing an example computing environment into which aspects of the subject matter described herein may be incorporated.

FIG. 10 is a schematic block diagram of a computing environment 1000 with which the disclosed subject matter can interact. The system 1000 comprises one or more remote component(s) 1010. The remote component(s) 1010 can be hardware and/or software (e.g., threads, processes, computing devices). In some embodiments, remote component(s) 1010 can be a distributed computer system, connected to a local automatic scaling component and/or programs that use the resources of a distributed computer system, via communication framework 1040. Communication framework 1040 can comprise wired network devices, wireless network devices, mobile devices, wearable devices, radio access network devices, gateway devices, femtocell devices, servers, etc.

The system 1000 also comprises one or more local component(s) 1020. The local component(s) 1020 can be hardware and/or software (e.g., threads, processes, computing devices). In some embodiments, local component(s)

1020 can comprise an automatic scaling component and/or programs that communicate/use the remote resources 1010 and 1020, etc., connected to a remotely located distributed computing system via communication framework 1040.

One possible communication between a remote component(s) 1010 and a local component(s) 1020 can be in the form of a data packet adapted to be transmitted between two or more computer processes. Another possible communication between a remote component(s) 1010 and a local component(s) 1020 can be in the form of circuit-switched data adapted to be transmitted between two or more computer processes in radio time slots. The system 1000 comprises a communication framework 1040 that can be employed to facilitate communications between the remote component(s) 1010 and the local component(s) 1020, and can comprise an air interface, e.g., Uu interface of a UMTS network, via a long-term evolution (LTE) network, etc. Remote component(s) 1010 can be operably connected to one or more remote data store(s) 1050, such as a hard drive, solid state drive, SIM card, device memory, etc., that can be employed to store information on the remote component(s) 1010 side of communication framework 1040. Similarly, local component(s) 1020 can be operably connected to one or more local data store(s) 1030, that can be employed to store information on the local component(s) 1020 side of communication framework 1040.

Figure 11:
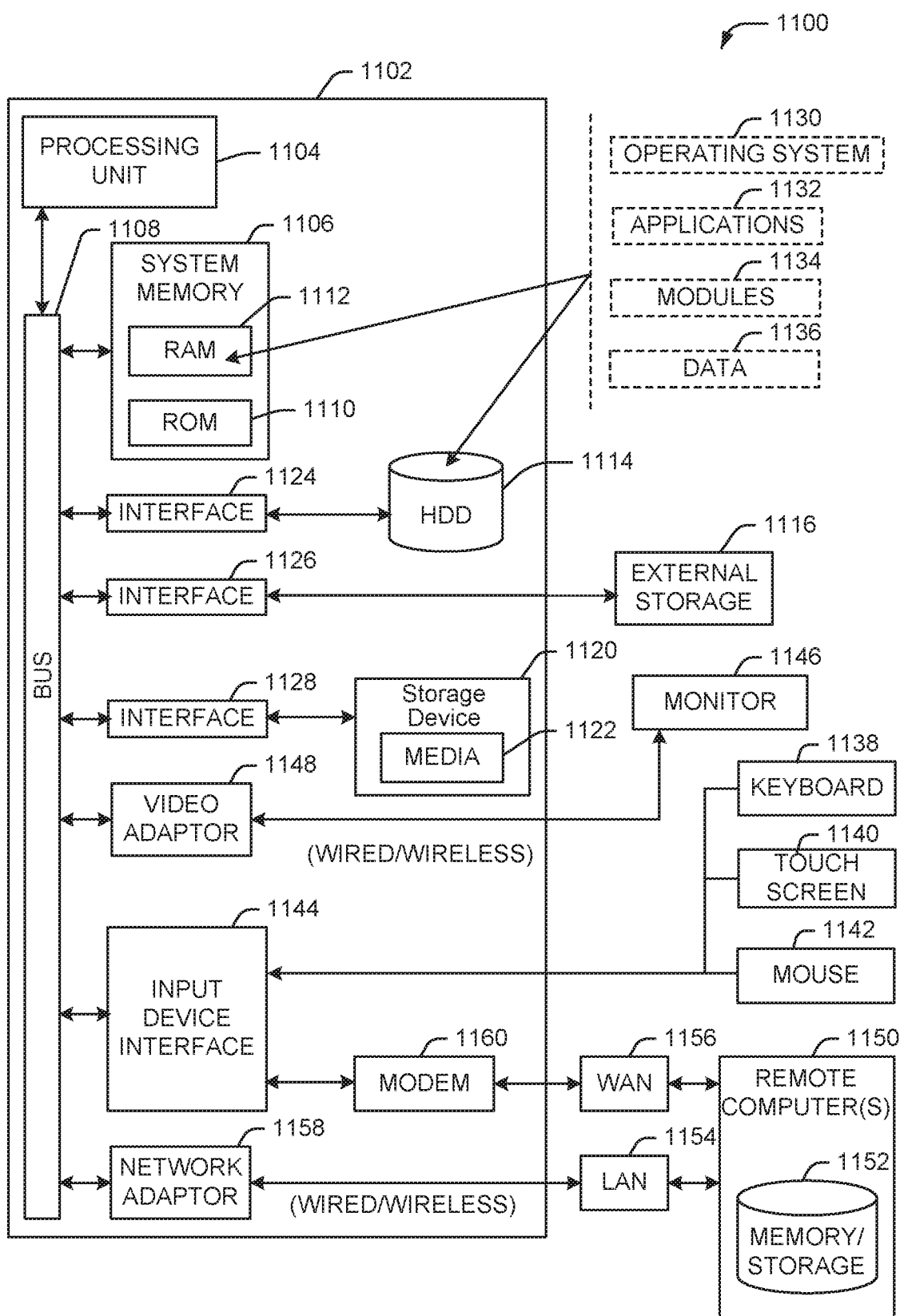
FIG. 11 depicts an example schematic block diagram of a computing environment with which the disclosed subject matter can interact/be implemented at least in part, in accordance with various aspects and implementations of the subject disclosure.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), and can include one or more external storage devices 1116 (e.g., a magnetic floppy disk drive (FDD) 1116, a memory stick or flash drive reader, a memory card reader, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114.

Other internal or external storage can include at least one other storage device 1120 with storage media 1122 (e.g., a solid state storage device, a nonvolatile memory device, and/or an optical disk drive that can read or write from removable media such as a CD-ROM disc, a DVD, a BD, etc.). The external storage 1116 can be facilitated by a network virtual machine. The HDD 1114, external storage device(s) 1116 and storage device (e.g., drive) 1120 can be connected to the system bus 1108 by an HDD interface 1124, an external storage interface 1126 and a drive interface 1128, respectively.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather is to be construed in breadth, spirit and scope in accordance with the appended claims.

What is claimed is:

1. A system, comprising:
a processor in a second node cluster storage system, and
a memory that stores executable instructions that, when executed by the processor, facilitate performance of operations, the operations comprising:
receiving, from a first node cluster storage system, metadata comprising information representing a virtual data structure corresponding to replicated data of a third data storage system coupled to the second node cluster storage system, wherein the metadata comprises first metadata, wherein the information comprises first information, wherein the virtual data structure is a first virtual data structure, and wherein the replicated data is first replicated data;

creating the virtual data structure based on the information;

converting the virtual data structure to a real data structure, comprising reading the replicated data from the third data storage system into actual storage space corresponding to the virtual data structure, wherein the real data structure is a first real data structure; and sending second metadata comprising second information representing a second virtual data structure from the second data storage system to the first data storage system, wherein the second virtual data structure corresponds to second replicated data to be read into a second real data structure by the first data storage system.

2. The system of claim 1, wherein the third data storage system comprises a legacy data storage system locally coupled to the second node cluster storage system.

3. The system of claim 1, wherein the real data structure is, instead of the first real data structure, a second real data structure intended to be a replica of the first real data structure maintained at the first node cluster storage system, and wherein the operations further comprise verifying whether the second real data structure is consistent with the first real data structure.

4. The system of claim 3, wherein the receiving the metadata further comprises receiving a first checksum corresponding to the first real data structure, and wherein the verifying whether the second real data structure is consistent with the first real data structure comprises determining a second checksum based on the second real data structure, and comparing the first checksum with the second checksum.

5. The system of claim 4, wherein the comparing provides an indication that that the first checksum does not equal the second checksum, and in response to the indication, requesting actual data of the first real data structure from the first node cluster storage system, receiving the actual data, and writing the actual data to the second real data structure.

6. The system of claim 1, wherein the real data structure comprises a data chunk.

7. The system of claim 1, wherein the real data structure is protected via erasure encoding.

8. The system of claim 1, wherein the first data storage system is coupled to a fourth data storage system that contains the second replicated data.

9. A method, comprising:

receiving, by a processor in a second node cluster storage system communicatively coupled via a first wide area network to a first node cluster storage system coupled via a first local area network to a first legacy storage system, information from the first node cluster storage system, the information representing a virtual data structure corresponding to replicated data maintained in the first legacy data storage system;

creating, by the processor, a virtual data structure based on the information;

attempting to read, by the processor via a second local area network different than the first local area network, data from a second legacy data storage system coupled to the first legacy data storage system, via a second wide area network, to create, at the second node cluster storage system, a real data structure corresponding to the virtual data structure; and in response to a successful attempt to read the data, verifying, by the processor, whether the data in the real data structure is consistent with counterpart data maintained at the first node cluster storage system.

10. The method of claim 9, wherein the attempting to read the data from the second legacy data storage system is successful, and wherein the verifying determines that the data in the real data structure is consistent with the counterpart data, and further comprising responding, by the processor, to requests for data maintained in the real data structure by accessing the data maintained in the real data structure.

11. The method of claim 9, further comprising, receiving, by the processor, first verification data associated with the virtual data structure from the first cluster storage system, wherein the verifying whether the data in the real data structure is consistent with counterpart data maintained at the first node cluster storage system comprises evaluating the first verification data with second verification data based on the data in the real data structure.

12. The method of claim 9, wherein the attempting to read the data from the second legacy data storage system is unsuccessful, and further comprising performing by the processor, a read failover to obtain the data.

13. The method of claim 9, wherein the attempting to read the data from the second legacy data storage system is successful, wherein the verifying whether the data in the real data structure is consistent with counterpart data maintained at the first node cluster storage system determines that the data is inconsistent, and further comprising, requesting, by the processor, actual data for the real data structure from the first node cluster storage system, receiving the actual data, and storing, by the processor, the actual data in the real data structure of the second node cluster storage system in place of the inconsistent data.

14. The method of claim 9, wherein the information comprises first information, wherein the virtual data structure is a first virtual data structure, wherein the data maintained in the second legacy data storage system is first legacy data, wherein the real data structure is a first real data structure, and further comprising, sending, by the processor via the first wide area network, second information representing a second virtual data structure from the second node cluster storage system to the first node cluster storage system, wherein the second virtual data structure corresponds to second legacy data to be read into a second real data structure by the first node cluster storage system, via the first local area network.

15. A non-transitory machine-readable medium, comprising executable instructions that, when executed by a processor of second node cluster storage system in a replicated storage environment, facilitate performance of operations, the operations comprising:

receiving information from a first node cluster storage system via a first wide area network connecting the first node cluster storage system and the second node cluster storage system, the information representing a virtual data structure corresponding to legacy data maintained in a legacy data storage system, wherein the legacy data storage system comprises a first portion and a second portion of the legacy data storage system, wherein the first portion and the second portion are connected via a second wide area network, and wherein the second portion of the legacy data storage system is locally coupled to the second node cluster storage system via a first local area network connecting the second portion of the legacy data storage system to the second node cluster storage system;

creating a virtual data structure based on the information; and reading a copy of the legacy data from the second portion of the legacy data storage system into storage space allocated in the second node cluster storage system to provide a real data structure that maintains, in the second node cluster storage system, a replicated copy of the data.

16. The non-transitory machine-readable medium of claim 15, wherein the operations further comprise receiving a request for object data, determining that the object data is maintained in the real data structure in the second node cluster storage system, reading the object data from the real data structure, and returning the object data in response to the request.

17. The non-transitory machine-readable medium of claim 15, wherein the operations further comprise receiving a checksum in conjunction with the information from the first node cluster storage system, and using the checksum to verify the copy of the data in the real data structure.

18. The non-transitory machine-readable medium of claim 15, wherein the information is first information, wherein the virtual data structure is a first virtual data structure, and wherein the operations further comprise creating a second virtual data structure corresponding to second legacy data maintained in the legacy data storage system, and sending second information representing the second virtual data structure to the first node cluster storage system via the first wide area network to facilitate a data migration operation.

19. The non-transitory machine-readable medium of claim 18, wherein the legacy data is first legacy data, wherein the real data structure is a first real data structure, wherein the storage space is first storage space, and wherein the operations further comprise reading second legacy data from the legacy data storage system into the into second storage space corresponding to the second virtual data structure via a second local area network connecting the first portion of the legacy data storage system to the first node cluster storage system to provide a second real data structure.

20. The non-transitory machine-readable medium of claim 15, wherein the real data structure is protected via erasure encoding.

* * * * *